United States Patent [19]

Snijders

[11] Patent Number: 4,800,384

[45] Date of Patent: Jan. 24, 1989

[54] ARRANGEMENT FOR IDENTIFYING PERIPHERAL APPARATUS SUCH AS WORK STATIONS PRINTERS AND SUCH LIKE, WHICH CAN OPTIONALLY BE CONNECTED IN GEOGRAPHICALLY DIFFERENT LOCATIONS TO A COMMUNICATION NETWORK BY MEANS OF LOCAL COUPLING UNITS

[75] Inventor: Wilfred A. M. Snijders, Eindhoven, Netherlands

[73] Assignee: U.S. Philips Corporation, New York, N.Y.

[21] Appl. No.: 866,647

[22] Filed: May 27, 1986

[30] Foreign Application Priority Data

Jun. 6, 1985 [NL]  Netherlands ............... 8501632

[51] Int. Cl.⁴ ............................................. H04Q 9/00
[52] U.S. Cl. ...................... 340/825.520; 340/825.050
[58] Field of Search .................. 340/825.52, 825.22, 340/825.05, 825.51; 370/85

[56] References Cited

U.S. PATENT DOCUMENTS

| 4,510,493 | 4/1985 | Bux et al. ................ 340/825.22 |
| 4,604,620 | 8/1986 | Oho et al. ................ 340/825.52 |
| 4,646,292 | 2/1987 | Bither ..................................... 370/85 |
| 4,682,168 | 7/1987 | Chang et al. ............... 340/825.52 |
| 4,700,343 | 10/1987 | Champarnaud et al. ...... 340/825.51 |

OTHER PUBLICATIONS

"Philan, A Local-Area Network Based on a Fibre-Optic Ring", J. R. Brandsma, Philips Tech. Rev. 43, No. 1/2 10-21, Dec. 1986.

Primary Examiner—Donald J. Yusko
Attorney, Agent, or Firm—Marianne R. Rich

[57] ABSTRACT

A modular coupling unit which functions as an interface between a communication unit or peripheral apparatus and the communication network includes a code word signal generator for generating a unique address code which is representative of the geographical location in which the relevant coupling unit is "permanently" included in the communication network. This signal generator is and continues to be energized as soon as and for so long as a communication unit or peripheral apparatus is and has been connected to the coupling unit. The address codes generated in bursts by such a generator are transferred via a connecting cable between the relevant communication unit and the coupling unit to this communication unit. The relevant address code is stored in the coupling unit. On request and within the time regime holding for the communication network, the address code is read and transferred to a diagnostic module via the communication network. Thus a geographical survey of the communication network with the peripheral apparatus connected thereto can be obtained. The geographical address of a communication unit in which a disturbance has occurred can thus be determined, using an error search algorithm.

11 Claims, 3 Drawing Sheets

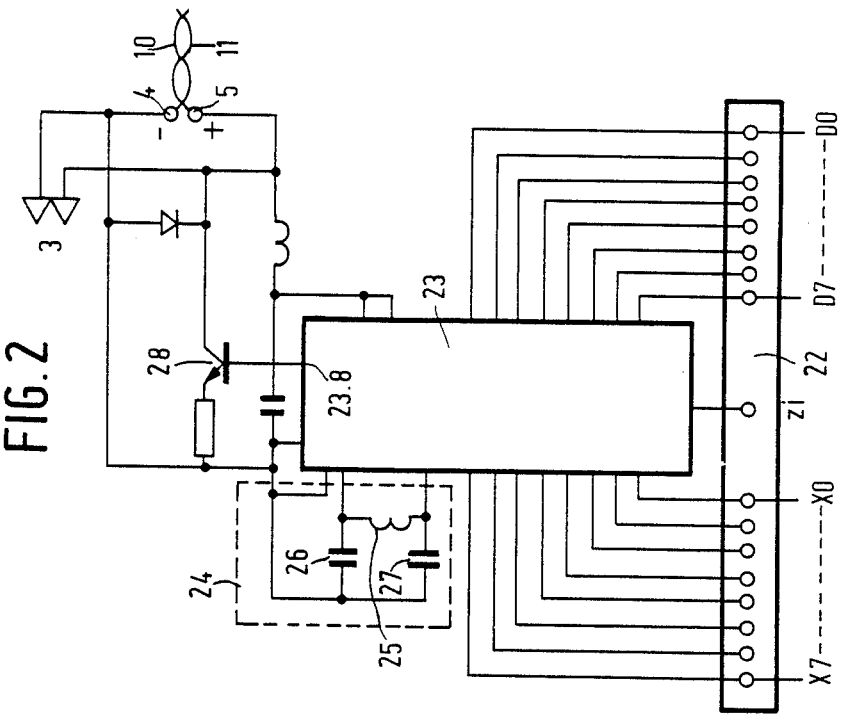

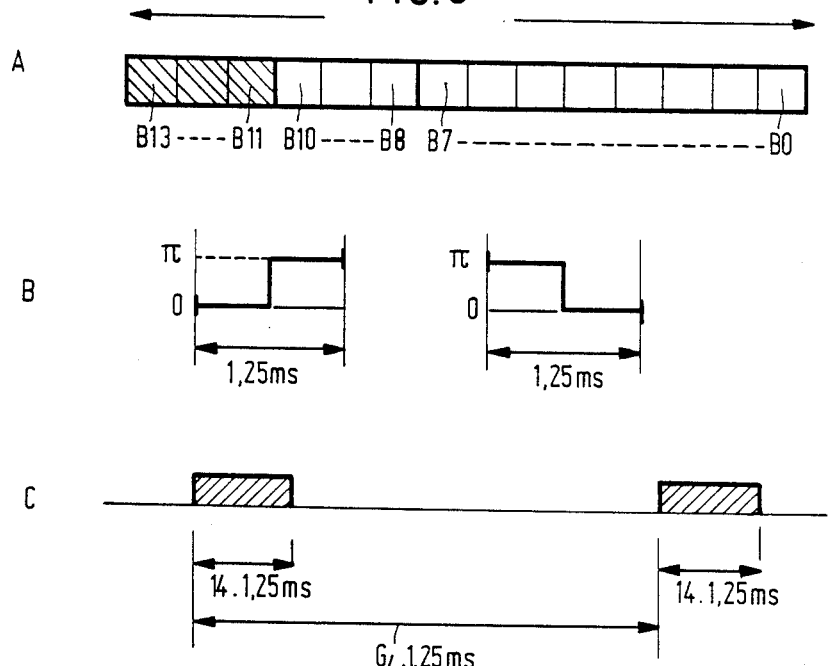
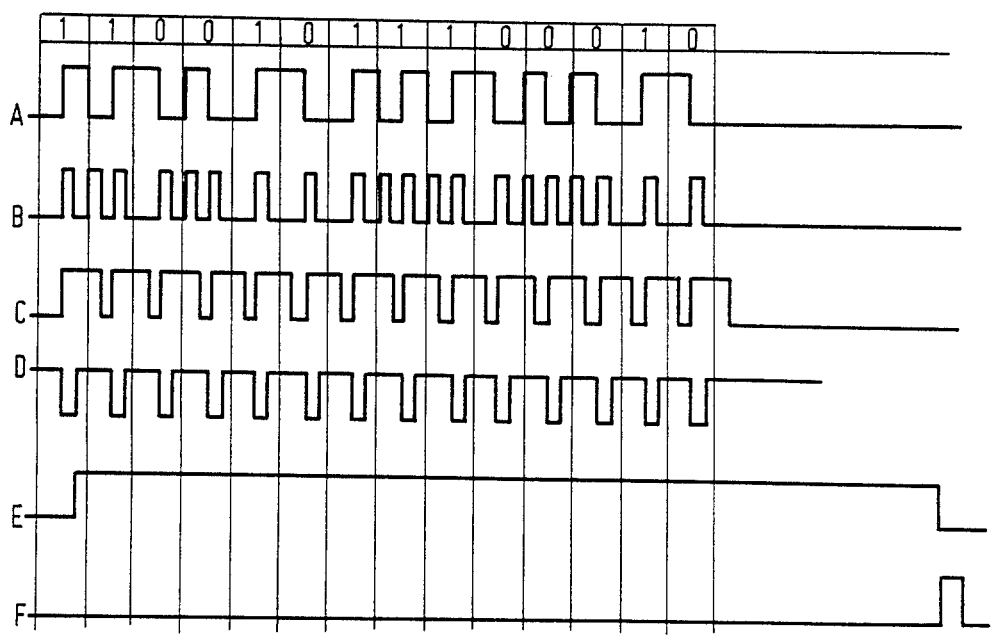

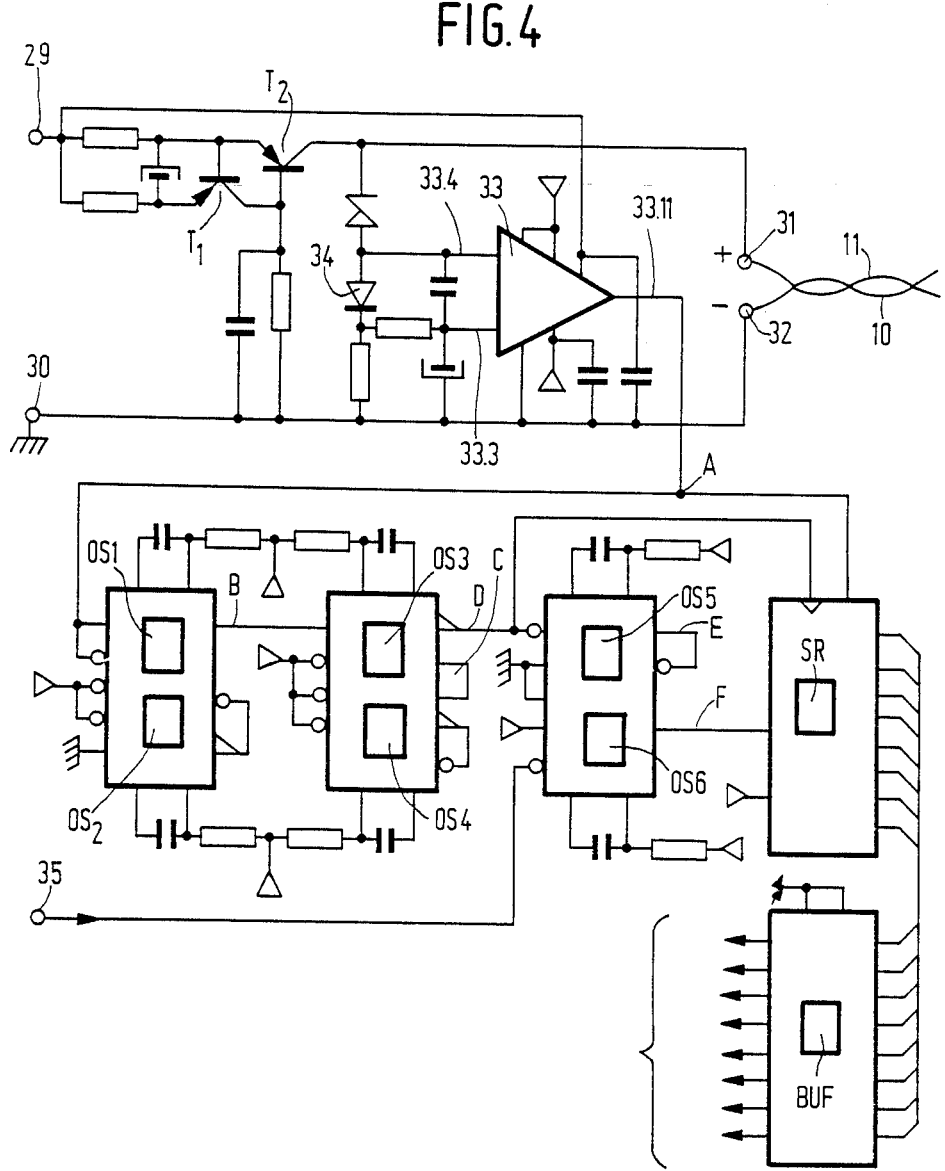

ARRANGEMENT FOR IDENTIFYING PERIPHERAL APPARATUS SUCH AS WORK STATIONS PRINTERS AND SUCH LIKE, WHICH CAN OPTIONALLY BE CONNECTED IN GEOGRAPHICALLY DIFFERENT LOCATIONS TO A COMMUNICATION NETWORK BY MEANS OF LOCAL COUPLING UNITS

BACKGROUND OF THE INVENTION

The invention relates in general to a communication network of the type in which various user sets, denoted peripheral apparatuses hereinafter, such as, for example, work stations, printers etc. can optionally be connected in geographically different locations to this communication network. To that end use is made of universal modular coupling units which act as an interface between a relevant peripheral apparatus and the communication network, it then being possible for such a peripheral apparatus to be detachably connected to this communication network. Thus, users can connect, according to their requirements and in optional positions, a relevant peripheral apparatus to the communication network. This implies that the geographical location addresses, denoted physical addresses hereinafter of the peripheral apparatus connected to the communication network can be different considered in the time. Generally, each peripheral apparatus having access to the communication network is uniquely characterized by what is commonly referred to as a functional address. Thereby the functional identity such as type and characteristic of each peripheral apparatus is fully and unambigously determined. Thus, each peripheral apparatus connected to the communication network can be addressed and checked, for example in connection with control functions to be remotely performed. For performing a diagnostic function it is, however, required at all times to have the availability of the physical addresses of the peripheral apparatus connected to the communication network. To that end, an address portion which might serve as a variable physical address for the relevant peripheral apparatus might be added to each functional address. However, such an approach does not ensure a simple and reliable diagnostic.

The invention has for its object to improve a communication network of the above-defined type such that on the one hand the physical addresses of the relevant peripheral apparatuses can be changed in a simple way without user-unfriendly disciplines, on the other hand that a diagnostic system module can be informed in an unambiguous and reliable way of these physical address data which are required in addition to the functional address data for a complete performance of the diagnostic system functions.

Within the framework of the invention there is however the problem that the reporting of the physical address data from such coupling units must satisfy a number of different requirements. The most important of these requirements are: the physical address information must be generated within a comparatively small physical volume, the address generating procedure must be initiated autonomously on connection of the peripheral apparatus to a coupling unit, an adequate number of different address codes must be available, it being a prerequisite that a desired address code is adjustable in a simple way on installation, the generating procedure must be immune within predetermined limits from supply voltage fluctuations, the address reporting must be accompanied by a low power consumption, and the cost price must be economically attractive.

Taking the above-described problems as a starting point, the invention is further based on the recognition that the modular coupling units are connected permanently and at a fixed location to the communication network and thus may be sources for the various physical addresses necessary in connection with the diagnostic function.

SUMMARY OF THE INVENTION

The above-described object is accomplished by a modular coupling unit which serves as an interface between a communication network and a peripheral apparatus connectable thereto and, according to the invention, is characterized by a code word signal generator including means for triggering the generating operation in response to an applied external triggering signal, and also a settable coding portion arranged for having this generator generate an optionally adjusted code word signal.

It should be noted that a code word signal generator of the above-described type is known per se as a component of a remote control for a TV receiver.

The invention can advantageously be used for a communication network in which the modular coupling units forming part thereof are each provided with an electrically energizable switching member which in the energized or the non-energized state, respectively may constitute a transmission circuit which directly passes through the coupling unit or a transmission circuit bypassing the coupling unit, respectively. A modular coupling unit according to the invention is characterized in that said means are arranged for deriving from an applied supply voltage for energizing said switching member the operating supply voltage for said code word signal generator; and the modular coupling unit further includes a modulator arranged for modulating the code word signal generated by the code word signal generator on said supply voltage.

In this situation the supply current line for the energizing means of the switching member, which is to be connected to the coupling unit can be used as a transmission line through which a code word signal generated by the coupling unit can be transmitted to an apparatus connected to the relevant coupling unit.

Inherently, a code word signal generator known per se and such as it is used in a coupling unit according to the invention, has a code word signal generated thereby available in the shape of a sequence of dual phase pulses, the direction of a phase jump always being decisive for the bit value of an information pulse. Because of this property the modulator can be implemented in a simple way. More particularly, a modular coupling unit according to the invention is further characterized in that said modulator is in the form of an electrically controllable switch whose main current circuit is connected in parallel with a connector for receiving said supply voltage, and the control input is connected to said code word signal generator.

A modular coupling unit according to the invention can further be advantageously used in an optical fibre communication network comprising peripheral apparatuses appropriate for communication via such a network. Such a peripheral apparatus then includes a power supply portion for producing the supply voltage for the switching member in the relevant coupling unit which is energized as soon as the relevant peripheral apparatus is connected to the coupling unit. According to the invention, a peripheral apparatus then includes a register for storing a code word which corresponds to a code word signal generated by the code word signal generator, and also means arranged for reading the register in response to a command signal received via the communication network and time-controlled thereby, the code word signal read being adjusted to a shape appropriate for optical fibre communication.

The invention is inter alia suitable for communication networks of the type referred to as LAN (local area network). Such a network is specifically designed for a geographically limited area having a comparatively high communication traffic density. Such a communication network sometimes comprises a loop line, more specifically an optical fibre transmission line, it being possible for the relevant peripheral apparatuses to be connected detachably in the said geographical locations to this communication network via modular coupling units according to the invention. Then the supply current line and the transmission line are incorporated in one cable as the component parts of a relevant peripheral apparatus, the cable having a connector for connection to a relevant modular coupling unit. As soon as a peripheral apparatus is connected to a coupling unit, an address code signal is generated from there, which address code signal is conveyed via the supply line to the peripheral apparatus and stored there in the register incorporated therein. The content of that register can then be read on call from a remote diagnostic module via the actual transmission circuit in which the peripheral apparatus is included. Thus a complete geographic survey of the peripheral apparatuses connected to the communication network can be obtained. On installing the communication network, the physical address corresponding to each coupling unit forming part of the communication network can be set by means of the coding portion of the relevant code word signal generator.

BRIEF DESCRIPTION OF THE DRAWINGS

For a more detailed description of the invention, an embodiment illustrative for the invention will now be described by way of example with reference to the accompanying drawing, in which FIG. 1 is a general block circuit diagram of a modular coupling unit in conjunction with a peripheral apparatus connected thereto;

FIG. 2 is a more detailed circuit diagram of a code word signal generated forming part of a modular coupling unit;

FIG. 3 is a circuit diagram for illustrating the shape in which a code word signal is generated by the signal generator;

FIG. 4 is a circuit diagram of a peripheral apparatus portion relevant to the invention and suitable for use in conjunction with a modular coupling unit according to the invention; and FIG. 5 is a circuit diagram for illustrating different signals such as they can be present in different locations in the circuit arrangement of FIG. 4.

DETAILED DESCRIPTION OF THE PREFERRED EMBODIMENT

In the block circuit diagram of FIG. 1 reference numeral 1 denotes a modular coupling unit according to the invention. Generally, this modular coupling unit is in the form of a wall outlet which is fitted in a fixed location within the geographically limited area over which the relevant communication network extends. Normally such a coupling unit includes a switching member, for example a switch 2, which can be opened by energizing means 3. By means of connectors, not further shown and forming part of the coupling unit, the switch 2 is connectable to a relevant communication network. In addition, the coupling unit includes two connecting terminals 4 and 5 for receiving a supply voltage for the energizing means 3. A code word signal generator 6 with an adjustable encoding portion 7 forming part thereof is also connected to these energizing means. In a preferred embodiment of the invention, this code word signal generator 6 is constituted by a signal generator which is known per se and forms part of a control unit for the remote control of a TV-receiver. The coding portion 7 of such a signal generator has a wiring pattern whose configuration is decisive for the address code signal produced by the generator. On installing of the communication network, the relevant coupling unit being connected to a predetermined position in this network, the wiring pattern is set such that a code word signal is produced which is a unique indication for the geographical position of the relevant coupling unit. As soon as a supply voltage is applied across the connecting terminals 4, 5, the switch 2 is opened as a result of which a relevant peripheral apparatus, denoted in FIG. 1 by reference numeral 8 is connected to the communication network via an apparatus cable, a portion of which is schematically denoted by reference numeral 9 and also the code word signal generator is made operative, causing an address code signal to be produced at its output 12. This code word signal controls a modulator 13 whereby the supply voltage generated across the connecting terminals 4, 5 are modulated with this code word signal and conveyed to the relevant peripheral apparatus via the supply conductors 10, 11. In other words, in response in the present case, to an external stimulation signal obtained by plugging the apparatus cable into the relevant coupling unit, an address code unique for the geographical location thereof is automatically produced and applied to the relevant peripheral apparatus. In addition to an electric supply portion 14, such a peripheral apparatus includes a sensor portion 15 which at its output 16 supplies a signal corresponding to the variations of the modulated supply voltage generated across the input terminals 17 and 18, a receiver 19 which at its output 20 generates a signal corresponding to the address code generated by the relevant coupling unit and a register 21 for storing such an address code.

For the sake of completeness, it should be noted that in a communication network which is not relevant to the invention, such a register is read on call by a diagnostic system within the time regime valid for the communication network. The relevant diagnostic instruction is then performed and the content of the register, more specifically a physical address unique for the geographical location of the relevant coupling unit, is transferred to a diagnostic system in combination with the functional address of the relevant peripheral apparatus and a test data about local optical power. Thus, in the diagnostic system a geographical survey can be obtained of the physical and functional addresses of the peripheral apparatus connected to the communication network.

In a practical embodiment of such a communication network an eight-bit code for the physical addresses of the relevant peripheral apparatus is sufficient. In the chosen embodiment of the code word signal generator 2048 different codes are however possible.

FIG. 2 shows a more detailed circuit diagram of an embodiment of a code word signal generator which forms part of a modular coupling unit such as reference numeral 1. Such a code word signal generator has a wired field 22, an integrated circuit 23 and an oscillator portion 24. The oscillator portion is constituted by a choke 25 in microstructure and two capacitors 26 and 27. The integrated circuit 23 can operate at a voltage varying between 4.75 and 12.6 volts and this integrated circuit is directly fed from the above-mentioned supply conductors 10, 11 from the connected peripheral apparatus.

An address code can optionally be set by connecting both the input terminal Zi and also one of the eight input terminals X0 to X7 of the wired field to one of the eight output terminals D0 to D7 of the integrated circuit 23. The connection formed via the Zi-contact determines the two most significant bits of the relevant address code, whilst the connection via the relevant X-contact is decisive for the remaining six bits of the eight-bit code word. The code value C of a chosen code word is defined by:

$$C = 64 \ (D_z \bmod 4) + 8x + d_x,$$

wherein $D_z$ represents the ordinal number of the relevant D-output contact 0–7 connected to the terminal $Z_i$, x represents the ordinal number of the relevant X input terminal connected to a relevant D-output terminal and $d_x$ represents the ordinal number of the relevant D-output terminal. For setting, for example, the code 209 the connecting wires must be applied between the terminals $Z_i$—D3 and X2—D1; the code 211 is set by applying the connecting wire between the terminals $Z_i$—D7(=D3) and X2—D3.

At the output terminal 23.8 of the integrated circuit 23 a code word signal is generated in the form of a sequence of bi-phase pulses, the direction of the phase jump being decisive for the bit value of a relevant bit. All this is illustrated in FIG. 3B. The signal generated across this terminal 23-8 controls a transistor 28, whereby the supply voltage applied across the connecting terminals 4 and 5 is modulated with the generated address code.

FIG. 3A is illustrative for a code word signal generated by the signal generator of the structure described above as soon as a supply voltage is applied to the connecting terminals 4, 5 (FIG. 2). For the proposed embodiment of the signal generator such a code word signal is formed by fourteen bits B0–B13. In the embodiment described, the bits B0–B7 are used for the address code, the bits B8–B10 are empty bits and the bits B11–B13 serve as heading of the address code message. These bits are, for example, generated at a frequency of 800 Hz, which corresponds to a 1.25 ms bit interval. FIG. 3B illustrates the bi-phase character of such bits; a bit having the value "1" or the value "0", respectively is represented by a 0 -$\pi$ or $\pi$- 0 phase jump, respectively. As is shown in FIG. 3C, in the proposed embodiment of the signal generator the code words are produced in bursts having a repetition rate corresponding to a 80 ms time interval, i.e. 64-bit time intervals. In other words a fourteen-bit code word is always followed by a pause interval corresponding to 50 bit intervals.

FIG. 4 illustrates a circuit diagram of a code word signal receiver inserted in a peripheral apparatus. In this situation such a peripheral apparatus has a power supply portion, more specifically a current source comprising the transistors T1 and T2 by means of which, starting from a 12 volts d.c. voltage produced in the peripheral apparatus across the connection terminals 29 and 30, a supply current of approximately 200 ma is continuously produced, it being possible to increase this supply current briefly to 250 ma for changing over said switching member in the relevant coupling unit. Across the connecting terminals 31, 32 the energizing current required for the switching member of the relevant coupling unit and also the code word signalling transmitted from the relevant coupling unit is supplied via the electric conductors 10 and 11. Such a code word signal is received there in the form of voltage variations of approximately 0.7 volt superposed on a d.c. voltage level which can considerably fluctuate in practice, for example between 5 and 8 volts. Then the required TTL-voltage levels are recovered by means of a voltage comparator 33. This voltage comparator compares a voltage at the input 33.4 and corresponding to the received code word signal voltage with a smoothed reference voltage applied to the input 33.3. A diode 34 introduces a level jump of approximately 0.4 volt, in other words approximately half the signal amplitude.

Thus, a signal which corresponds to the code word signal received across the connecting terminals 31 and 32 is generated at the output 33.11 of the signal comparator 33. FIG. 5A shows, by way of example, such a code word signal as it is produced at the output of the signal comparator.

The further portion of the code word signal receiver is arranged for performing the functions of clock signalling, field synchronisation, bi-phase decoding, series-parallel conversion and storing the eight last bits of a received fourteen-bit message. In FIG. 5, the signal waveforms such as they can be created in the correspondingly denoted positions in the circuit diagram of FIG. 5 are shown on the lines A, B, C, D, E and F. A number of monostable multivibrator circuits OS1–OS6 is used for clock signalling and field synchronisation. To this end the multivibrator circuits OS1 and OS2 are operative to produce a pulse in response to both the leading and the trailing edges of a received signal having a shape as shown in FIG. 5A. These pulses are combined at the output B of the multivibrator circuit OS1. The multivibrator circuit OS3 is arranged to select from this sequence of pulses those pulses which coincide with the sudden transient of the received code word signal, halfway a bit interval. This sequence of crosses as shown in FIG. 5C is applied to the monostable multivibrator circuit OS4 which is operative for producing a sequence of 14 clock pulses as shown in FIG. 5D. These clock pulses are used to sequentially feed the code word signal generated at the comparator output 33.11 into a shift register SR used for storing the relevant eight bit address code word. By thus feeding-in a received code word signal under the control of this sequence of clock pulses, the decoder function of the received address message is accomplished at the same time. The last eight bits B7–B0 of a received fourteen-bit code word signal thus remain stored in the shift register SR after said sequence of fourteen clock pulses has ended after the fourteen-bit burst has ended. The monostable multivibrator circuit OS5 provides the code word signal burst synchronisation. As soon as a clock pulse appears, this multivibrator circuit OS5 changes state, the storage time having been chosen such that the trailing edge of the output signal as illustrated in FIG. 5E is always contained in a pause interval such as this interval is present after a code word signal. Such a trailing edge thus always defines a period of time in which the content of the shift register SR is "static". This fact is utilised in that such a trailing edge is decisive for changing the state of the monostable multivibrator circuit OS6 as a result of which a pulse as illustrated in FIG. 5F is produced. Such a pulse is active for transferring the content of the shift register SR to an eight-bit buffer BUF at whose output the relevant address code word can be read in parallel. By means of a blocking signal which can be applied to a connecting terminal 35 such a code word transfer can be prevented when such a code word must be read from the buffer BUF. This read-out is effected on call from a diagnosis module and within the time regime of the transmission circuit to which the relevant peripheral apparatus is connected. An address code word read from the buffer BUF is adjusted by means, not further shown, to a shape suitable for transmission through the said transmission circuit.

It is possible that transient errors are introduced in a decoded address word read from the buffer BUF. A protection from such errors can simply be included in the programs of the relevant diagnostic system which gives a survey of the functional and physical addresses. Since the content of such a buffer is periodically refreshed, in the embodiment described at 80 ms time intervals, faulty address codes can be eliminated in a simple way from the survey obtained by comparing consecutively read address code words with each other. Thus, the total network status can be monitored in a reliable manner via a diagnostic module. Because then a geographical survey of the network configuration is available it is possible to act effectively in the case of calamities, as a charactertistic feature of a "faulty" peripheral apparatus is that it no longer responds to commands. If such a situation occurs, then the "faulty" peripheral apparatus can be located by analysing status Tables.

The invention can be used advantageously in all those cases in which a peripheral apparatus which can be connected detachably to a communication network via a connector link, is to be characterized by an unambiguously defined address code.

What is claimed is:

1. A modular coupling unit serving as an interface between a communication network and a peripheral apparatus connectable thereto, comprising:
   (a) at least two input/output voltage terminals;
   (b) a code word signal generator coupled to said voltage terminals including means for triggering a generating operation in response to an external triggering signal applied to said voltage terminals, wherein said means for triggering a generating operation are arranged for deriving an operating supply voltage;
   (c) a settable coding portion arranged for having said code word signal generator generate an optionally adjusted code word signal; and
   (d) a modulator arranged for modulating on said supply voltage said code word signal generated by said code word signal generator and for supplying a modulated voltage to said input/output terminals.

2. A modular coupling unit according to claim 1, further comprising:
   (e) an electrically energizable switching member coupled to said voltage terminals which in an energized state constitutes a transmission circuit directly passing through said coupling unit, and in a non-energized state constitutes a transmission circuit bypassing said coupling unit, wherein said supply voltage is for energizing said switching member.

3. A modular coupling unit according to claim 2, wherein said modulator is in the form of an electrically controllable switch whose main current circuit is arranged in parallel with a connector for receiving said supply voltage, and the control input is connected to said code word signal generator.

4. A modular coupling unit according to claim 2 or 3, and arranged for a communication network, in combination with a peripheral apparatus arranged for communication via said network, the peripheral apparatus including a power supply portion for producing said supply voltage, wherein the peripheral apparatus further includes a register for storing a code word which corresponds to a code word signal generated by the code word signal generator, and also means arranged for reading the register in response to a command signal received via the communication network and under the time regime thereof, the code word signal read being brought to a shape suitable for network communication.

5. A modular coupling unit serving as an interface between a communication network and a peripheral apparatus connectable thereto, comprising:
   (a) at least two input/output voltage terminals;
   (b) a code word signal generator coupled to said voltage terminals for triggering a generating operation in response to an external triggering signal applied to said voltage terminals;
   (c) a settable coding portion arranged for having said code word signal generator generate an optionally adjusted code word signal;
   (d) first line means for transmitting data between said communication network and said peripheral apparatus; and
   (e) second line means coupled to said voltage terminals for transmitting said optionally adjusted code word signal from said modular coupling unit to said peripheral apparatus.

6. A modular coupling unit according to claim 5, wherein:
   said second line means are power lines carrying a supply voltage.

7. A modular coupling unit according to claim 6, further comprising:
   (f) a modulator arranged for modulating on said supply voltage said code word signal generated by said code word signal generator, wherein
   said means for triggering a generating operation are arranged for deriving an operating supply voltage.

8. A modular coupling unit according to claim 7, further comprising:
   (g) an electrically energizable switching member coupled to said voltage terminals which in an energized state constitutes a transmission circuit directly passing through said coupling unit, and in a non-energized state constitutes a transmission circuit bypassing said coupling unit, wherein said supply voltage is for energizing said switching member.

9. A modular coupling unit according to claim 8, wherein:
said modulator is in the form of an electrically controllable switch whose main current circuit is arranged in parallel with said voltage terminals, and the control input is connected to said code word signal generator.

10. A modular coupling unit according to claim 8, and arranged for a communication network, in combination with a peripheral apparatus arranged for communication via said network, the peripheral apparatus including a power supply portion for producing said supply voltage, wherein:
the peripheral apparatus further includes a register for storing a code word which corresponds to a code word signal generated by the code word signal generator, and also means arranged for reading the register in response to a command signal received via the communication network and under the time regime thereof, the code word signal read being brought to a shape suitable for network communication.

11. A modular coupling unit according to claim 9, and arranged for a communication network in combination with a peripheral apparatus arranged for communication via said network, the peripheral apparatus including a power supply portion for producing said supply voltage, wherein:
the peripheral apparatus further includes a register for storing a code word which corresponds to a code word signal generated by the code word signal generator, and also means arranged for reading the register in response to a command signal received via the communication network and under the time regime thereof, the code word signal read being brought to a shape suitable for network communication.

* * * * *